United States Patent
Hess

(10) Patent No.: US 7,157,833 B2
(45) Date of Patent: Jan. 2, 2007

(54) TOOL USING A PIEZO ACTUATOR

(75) Inventor: Achim Hess, Korb (DE)

(73) Assignee: Atlas Copco Electric Tools GmbH, Winnenden (DE)

( * ) Notice: Subject to any disclaimer, the term of this patent is extended or adjusted under 35 U.S.C. 154(b) by 0 days.

(21) Appl. No.: 10/906,511

(22) Filed: Feb. 23, 2005

(65) Prior Publication Data

US 2005/0127788 A1    Jun. 16, 2005

Related U.S. Application Data

(63) Continuation of application No. PCT/EP02/09744, filed on Aug. 31, 2002, now abandoned.

(51) Int. Cl.
*H01L 41/08* (2006.01)
(52) U.S. Cl. .................. 310/323.18; 73/14; 60/652
(58) Field of Classification Search ........... 310/323.18; 173/14; 60/652
See application file for complete search history.

(56) References Cited

U.S. PATENT DOCUMENTS

| | | | |
|---|---|---|---|
| 3,501,099 A | 3/1970 | Benson | 239/585 |
| 3,635,016 A | 1/1972 | Benson | 60/23 |
| 4,173,725 A | 11/1979 | Asai | 310/325 |
| 4,741,731 A * | 5/1988 | Starck et al. | 604/22 |
| 5,055,733 A | 10/1991 | Eylman | 310/328 |
| 6,204,592 B1 * | 3/2001 | Hur | 310/323.18 |
| 6,617,760 B1 * | 9/2003 | Peterson et al. | 310/328 |
| 6,762,535 B1 * | 7/2004 | Take et al. | 310/323.18 |

FOREIGN PATENT DOCUMENTS

DE       44 07 962      6/1995

OTHER PUBLICATIONS

Maeda Kyoichi; Ultrasonic Saw; Patent Abstracts of Japan 03117513; May 20, 1991; attached English translation of JP patent document provided by JPO.

* cited by examiner

*Primary Examiner*—Darren Schuberg
*Assistant Examiner*—J. Aguirrechea
(74) *Attorney, Agent, or Firm*—Gudrun E. Huckett

(57) ABSTRACT

A tool has a tool insert and an electrically operated drive unit oscillatingly driving the tool insert. The drive unit has a piezo actuator and an adjusting travel enlarger coupled to the piezo actuator. The adjusting travel enlarger has a master piston, at least one slave piston, and at least one pressure chamber. The master piston acts through the at least one pressure chamber on the at least one slave piston. The piezo actuator and the master piston are fixedly connected to one another.

17 Claims, 4 Drawing Sheets

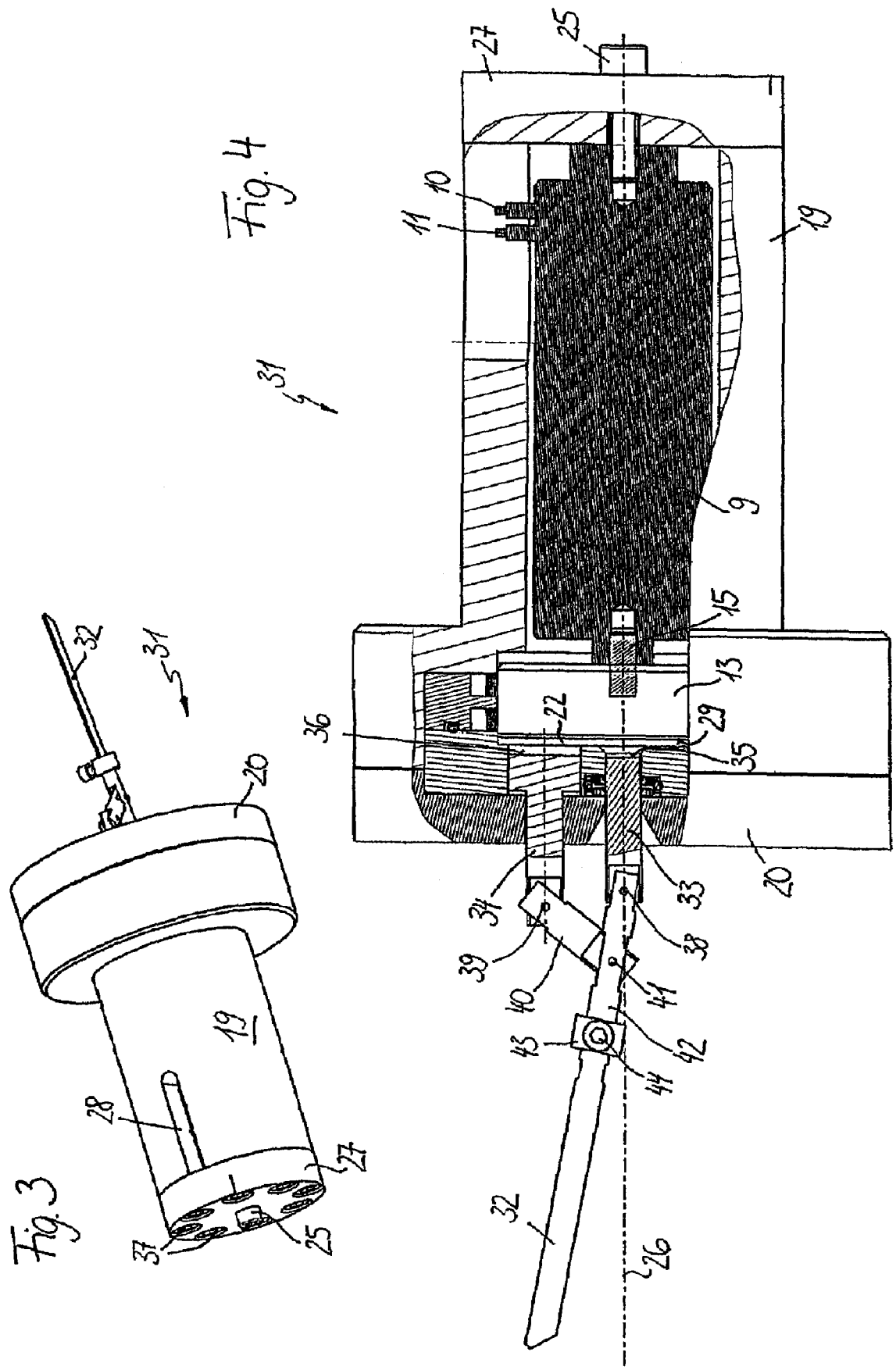

TOOL USING A PIEZO ACTUATOR

This is a continuation of International Application PCT/EP2002/009744 with an international filing date of Aug. 31, 2002, not published in English under PCT Article 21(2), and now abandoned.

BACKGROUND OF THE INVENTION

The invention relates to a tool, in particular a jigsaw, a saber saw, a drill or chisel hammer or the like, comprising a tool insert that is oscillatingly driven by an electrically operated drive unit.

For driving oscillatingly a tool insert in a tool such as a jigsaw, a saber saw, a drill hammer or chisel hammer or the like, electric motors are used whose rotary movement is transformed mechanically, for example, by connecting links, into a translatory, oscillating movement of the tool insert. In this connection, the moved masses cause vibrations. At the same time, the noise development as a result of the moving parts is relatively high. The stroke length of the oscillating movement as well as the temporal course of the traveled distance are fixedly preset by the mechanical system.

SUMMARY OF THE INVENTION

It is an object of the present invention to provide a tool of the aforementioned kind that generates few vibrations and is flexible in regard to different applications.

In accordance with the present invention, this is achieved in that the drive unit comprises a piezo actuator and an adjusting travel enlarger that is coupled to the piezo actuator.

By using a piezo actuator as a drive unit, the masses to be moved can be kept small so that hardly any vibrations and noises are generated. At the same time, by controlling the piezo actuator the stroke length as well as the temporal course of the stroke of the oscillating movement can be adjusted freely for the most part. Coupling the piezo actuator to an adjusting travel enlarger enables the conversion of the minimal stroke length that is achieved by a piezo actuator into the stroke length range that is required for electrically operated tools. The adjusting travel enlarger effects in this connection the increase of the adjusting travel to a multiple of the original travel. By means of the piezo actuator, stroke frequencies of approximately 100 Hz, as conventional in regard to electric tools, can be easily achieved. At the same time, forces of a few 100 N and strokes of approximately 20 mm can be realized. By a suitable control of the piezo actuator, the frequency of the oscillating movement as well as the stroke length can be changed in fractions of a second and can be adjusted to the respective application purpose. In addition, the time/travel profile can be varied. Because of the minimal number of movable parts, the noise development of the tool is very low.

The adjusting travel enlarger comprises a transducer or master piston that acts through at least one liquid-filled pressure chamber onto at least one slave piston. The adjusting travel enlarger configured in this way can be manufactured in a simple way and ensures at the same time a large stepping-up action of the adjusting travel from the transducer or master piston to the slave piston. At the same time, the number of movable parts is minimal so that wear of such an arrangement is minimal also. A simple embodiment results when the piezo actuator and the master piston are fixedly connected to one another. For a favorable transmission ratio of the adjusting travel, the pressure surface of the slave piston is expediently 0.2 percent to 20 percent, in particular, 1 percent to 10 percent of the pressure surface of the master piston It can be advantageous for the pressure chamber to act on two slave pistons having different pressure surfaces. In this way, different stroke length of the slave piston can be realized. The two slave pistons are, in particular, coupled with one another so that a coupled movement of the tool insert can be performed. Also, coupling three or more slave pistons can be advantageous. By designing the pressure surfaces as well as the coupling device appropriately, very different movement courses can be obtained. In this connection, the slave pistons can be slanted in different directions relative to the longitudinal axis of the piezo actuator.

In order to be able to drive the slave piston in both directions, it is provided that the master piston and the at least one slave piston comprise each two opposed pressure surfaces, wherein each pressure surface of the master piston is connected by a closed pressure chamber to the correlated pressure surface of the slave piston.

The pressure chamber is advantageously filled with glycerine, caoutchouc, rubber grease, oil or water. An advantageous configuration of the piezo actuator results when it is formed of stacked piezo elements. In this connection, each piezo element has expediently a thickness of 0.02 mm to 2 mm, in particular, of 0.5 mm to 1 mm.

BRIEF DESCRIPTION OF THE DRAWING

FIG. 3 is a perspective illustration of one embodiment of the drive unit.

FIG. 4 is a partial section view of the drive unit of FIG. 3.

DESCRIPTION OF THE PREFERRED EMBODIMENTS

Figure 1:
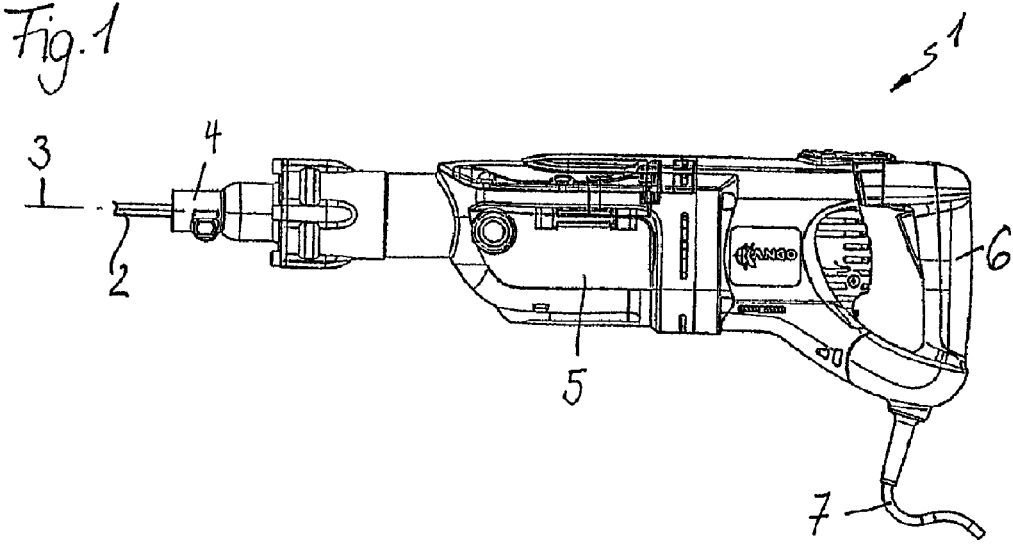
FIG. 1 is a side view of a drill and chisel hammer.

The drill and chisel hammer 1 illustrated in a side view in FIG. 1 has a tool insert 2 that is driven in rotation about its longitudinal axis 3 as well as oscillatingly in the direction of the longitudinal axis 3. The tool insert 2 is secured in a chuck 4 on the housing 5 of the drill and chisel hammer 1. An operating handle 6 is arranged on the housing 5. The drill and chisel hammer 1 is electrically driven. For supplying the electrical drive unit with electrical energy, a cable 7 is provided.

Figure 2:
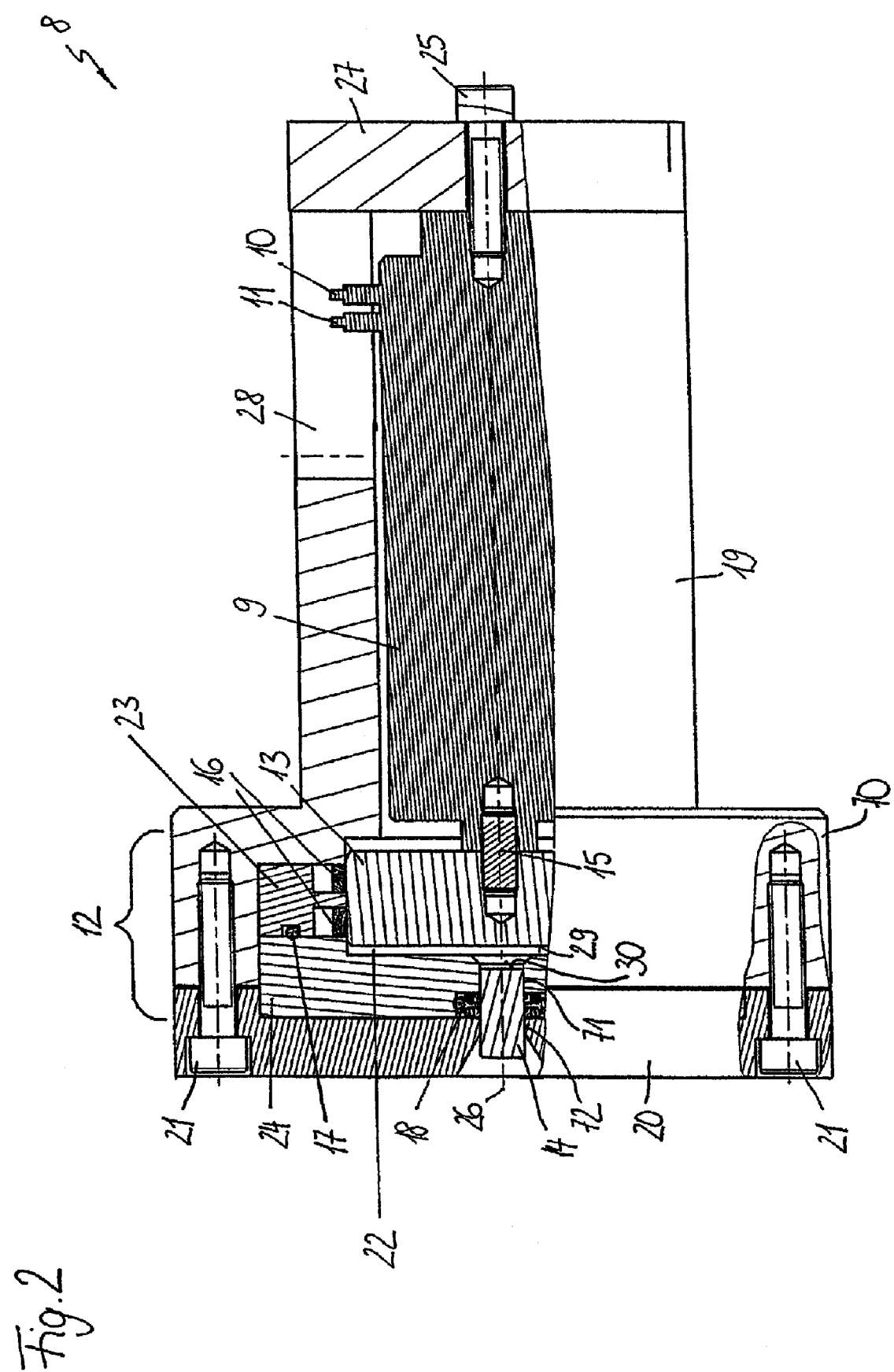
FIG. 2 is a partial section view of a drive unit.

In FIG. 2, a drive unit 8 for oscillatingly driving the tool insert 2 in the direction of the longitudinal axis 3 is illustrated partially in section. For rotatingly driving the tool insert 2 about the longitudinal axis 3, an additional drive (not illustrated) is provided. The drive unit 8 comprises a piezo actuator 9 that is arranged in a housing 19 and also comprises an adjusting travel enlarger 12. The piezo actuator 9 is secured on the bottom 27 of the housing 19 by a fastening screw 25. The piezo actuator 9 has two connectors 10 and 11 that project through a slot 28 to the exterior side of the housing 19. The connector 10 can be a connector for electrical voltage and the connector 11 a connector for controller monitoring. When supplying voltage, the piezo actuator 9 expands in the direction of the longitudinal axis 26. The piezo actuator 9 is comprised of individual packet-shaped stacked piezo elements. The individual piezo elements have a thickness of 0.02 mm to 2 mm. Advantageously, the piezo elements have a thickness of 0.5 mm to 1 mm. In order to produce a sufficiently long adjusting travel, it is provided that the piezo actuator 9 has a length of 100 mm to 200 mm, in particular of 130 mm to 160 mm, in the direction of the longitudinal axis 26.

The adjusting travel enlarger 12 comprises a master piston 13 and a slave piston 14 that are coupled to one another by a pressure chamber 22. The pressure surface 29 of the master piston 13 is significantly greater than the pressure surface 30 of the slave piston 14. Advantageously, the surface area of the pressure surface 30 of the slave piston 14 is 0.2 percent to 20 percent, in particular, 1 percent to 10 percent, of the surface area of the pressure surface 29 of the master piston 14. The master piston 13 is connected by a threaded bolt 15 fixedly to the piezo actuator 9. In the area of the adjusting travel enlarger 12 the housing 19 has a projection 70 with an enlarged diameter. In the projection 70, a ring 23 is supported in which the master piston 13 is guided and sealed by means of two seals 16. At the end face of the master piston 13, a disk 24 is arranged that has a central bore 71. In the bore 71, a slave piston 14 is guided and sealed by means of a seal 18 relative to the surroundings. An O-ring 17 is provided for sealing purposes between the disk 24 and the ring 23. Between the master piston 13 and the disk 24 a pressure chamber 22 is formed. The housing 19 is closed by a cover 20 that is secured with screws 21 on the housing 19. The cover 20 secures at the same time the disk 24. The slave piston 14 penetrates the cover 20 through the bore 72. The pressure chamber 22 is advantageously filled with glycerine, caoutchouc, rubber, grease, oil or water. Filling with other fluids or with a mixture of several fluids can be advantageous.

For oscillatingly driving the slave piston 14, a voltage is supplied by the connector 10 to the piezo actuator 9. As a result of the supplied voltage, the piezo actuator 9 expands in the direction of the longitudinal axis 26. In this way, the master piston 13 exerts a force on the pressure chamber 22. The pressure in the pressure chamber 22 is increased because of this force and causes a force to act on the slave piston 14. The slave piston 14 is forced in the direction of the longitudinal axis 26 out of the housing 19 and drives in this way the tool insert which is arranged especially in the direction of the longitudinal axis 26. The return movement of the slave piston 14 is realized by the force that is exerted by the workpiece onto the tool insert and the slave piston 14. In order to secure the slave piston 14 in the direction of the longitudinal axis 26, it can be expedient to provide the slave piston 14 at the end that is facing the master piston 13 with a projection whose diameter is greater than the diameter of the bores 71 and 72 so that the slave piston 14 is prevented from being pushed out of the housing 19.

It can be advantageous to provide a mechanical adjusting travel enlarger instead of the hydraulic adjusting travel enlarger. The piezo actuator can be coupled by a lever mechanism to the tool insert. Also, the transmission of the movement of the piezo actuator onto the tool insert by means of a gear arrangement can be advantageous.

Another embodiment is illustrated in FIGS. 3 and 4. Same reference numerals refer to the same components as in FIG. 2. The drive unit 31 illustrated in FIG. 3 in a perspective view is the tool insert 32 that can be, for example, a saw blade. The drive unit 31 has a housing 19 with a cover 20 and a bottom 27. The bottom 27 is secured with screws 37 on the housing 19. The master piston 13 illustrated in FIG. 4 acts by means of the pressure chamber 22 filled with caoutchouc, glycerine, rubber, grease, fat, oil or water onto the two slave pistons 33 and 34. The first slave piston 33 has a pressure surface 35 and the second slave piston 34 a pressure surface 36. The pressure surface 36 is greater than the pressure surface 35. In this way, the first slave piston 33 travels a greater distance than the second slave piston 34 for a given deflection of the master piston 13.

On the first slave piston 33, a hinge 38 of the actuator lever 42 is pivotably supported by means of a hinge or articulation 38. The actuator lever 42 has a receiver 43 for the tool insert 32. The tool insert 32 is fixed in the receiver 43 by a screw 44. The second slave piston 34 is coupled to the first slave piston 33 by a coupling lever 40. The coupling lever 40 is pivotally supported on the second slave piston 34 by a hinge 39. The coupling lever 40 is connected by a hinge 41 to the actuator lever 42. The hinge 41 is located on the side of the hinge 38 facing away from the pressure chamber 22. By coupling the two slave pistons 33 and 34, the tool insert 32 performs an oscillating movement that is comprised of a movement in the direction of the longitudinal axis 26 and a pivot movement about the hinge 38.

By coupling two or several slave pistons, different movements of the tool insert 32 can be achieved. It can be expedient to couple three or more slave pistons with one another. In this connection, one or several slave pistons can be arranged at a slant to the longitudinal axis 26.

Figure 5:
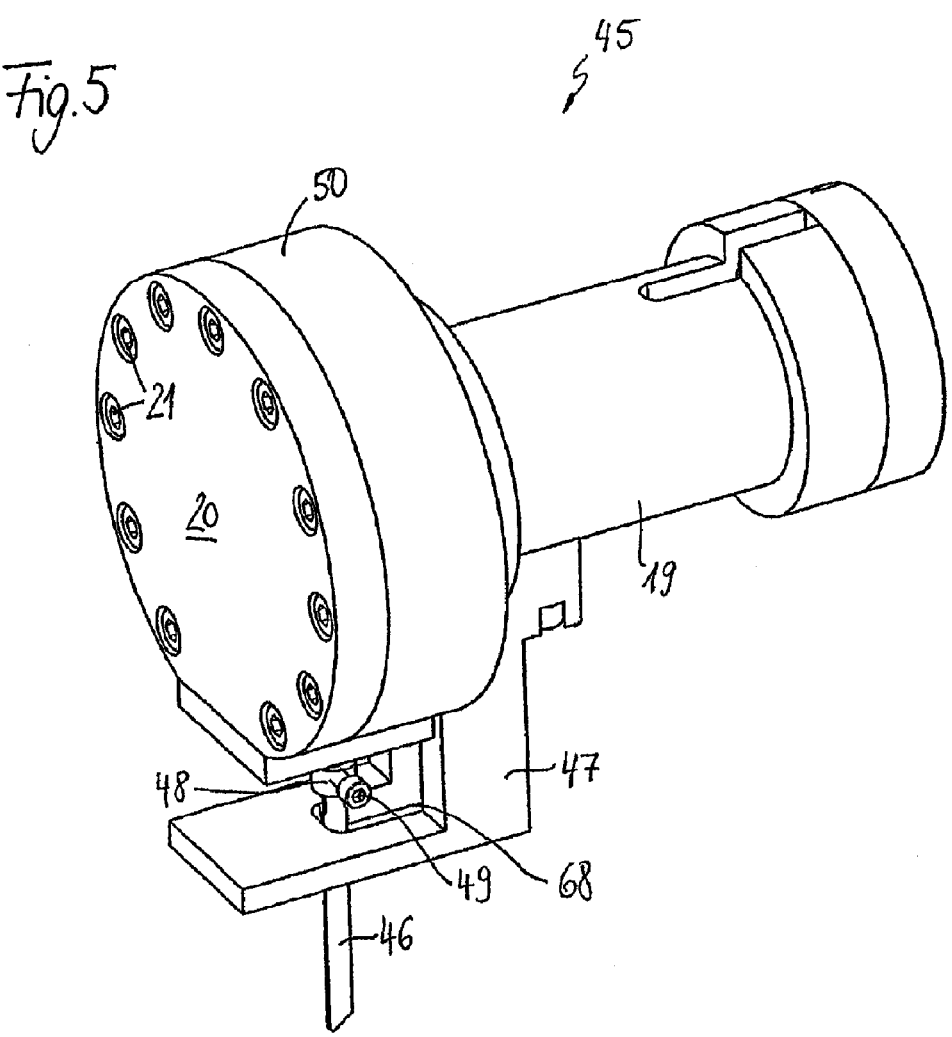
FIG. 5 is a perspective illustration of another embodiment of a drive unit.
Figure 6:
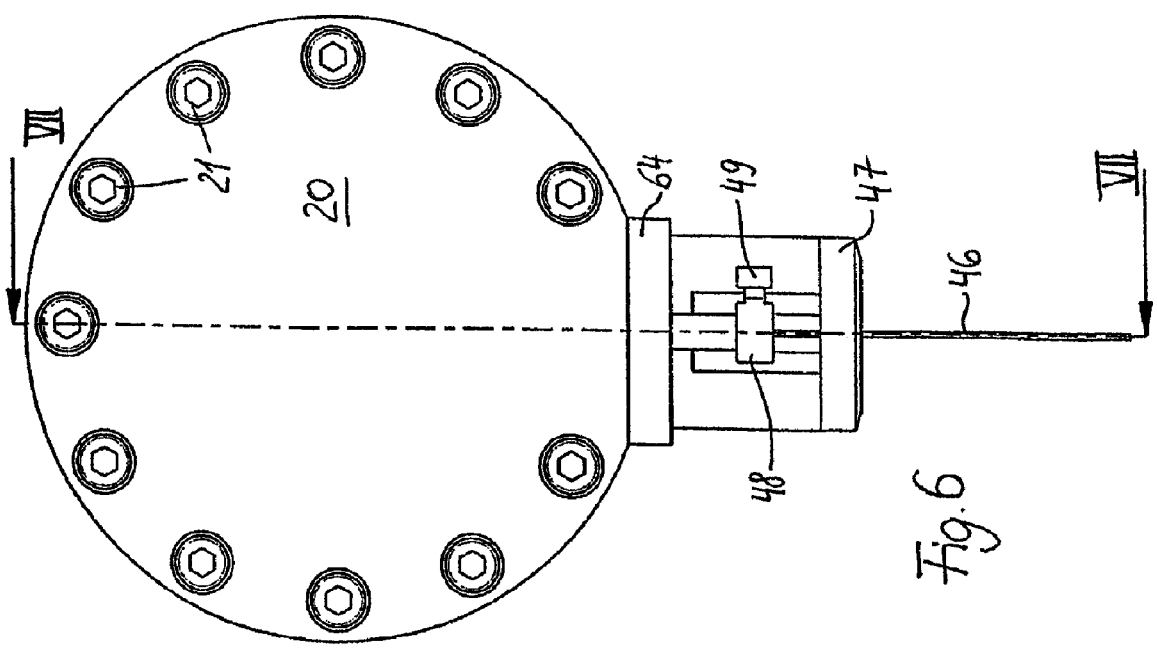
FIG. 6 is an end view of the drive unit of FIG. 5.

FIG. 5 shows a drive unit 45 that can be used, for example, for a jigsaw. In FIG. 5, same reference numerals refer to the same components as in FIG. 1. The drive unit 45 has a housing 19 on which a support 47 for the tool is secured. The support 47 has an opening 68 through which a tool insert 46, particularly a saw blade, projects. The tool insert 46 is secured in a receptacle 48 by means of a screw 49. A housing receptacle ('pot') 50 is connected to the housing 19 that is closed by the cover 20 attached by fastening screws 21 to the housing 19. As illustrated in FIG. 6, a plate 64 is secured on the side of the housing pot 50 facing the tool insert 46 and the cover 20.

Figure 7:
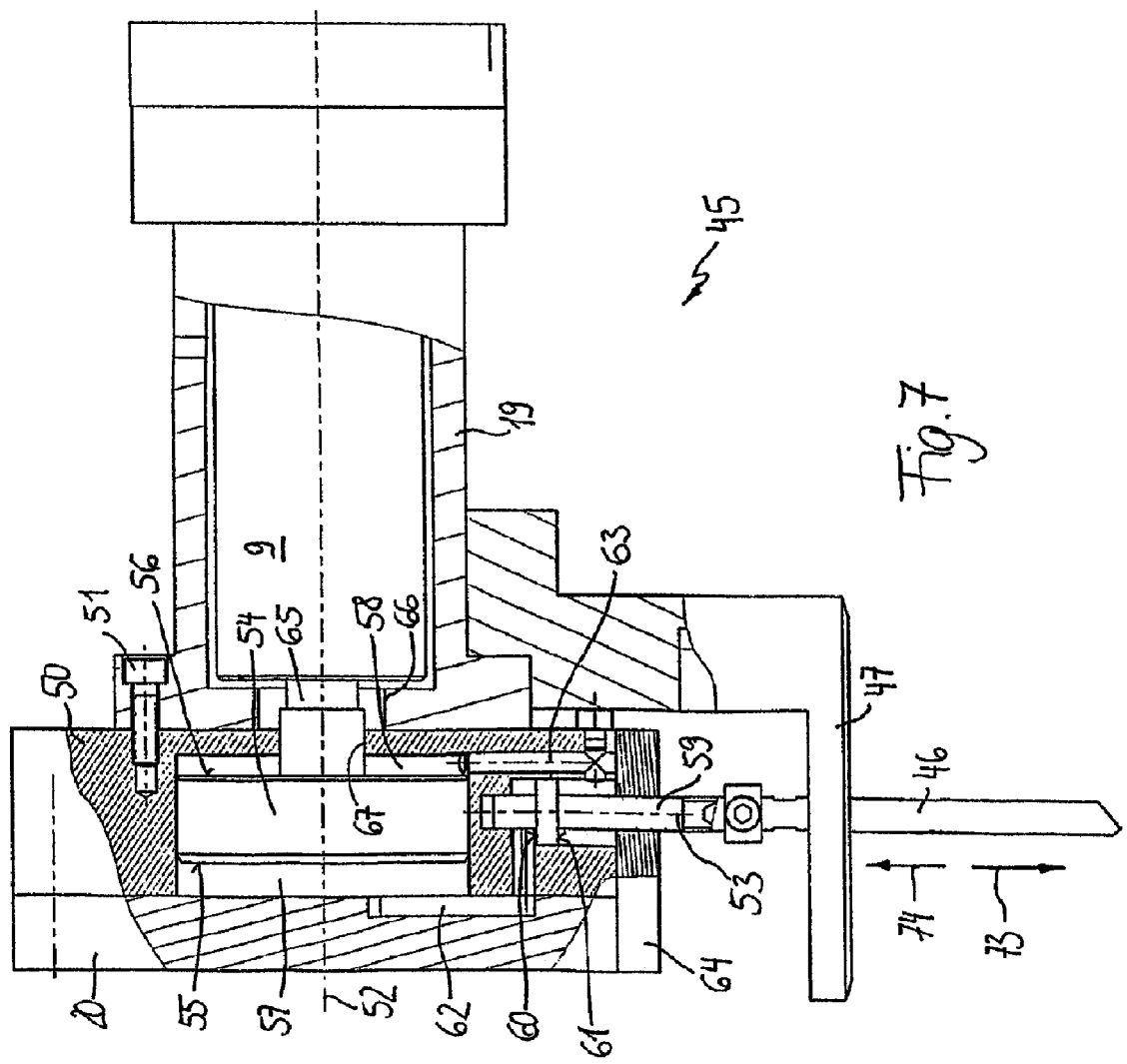
FIG. 7 is a partial section view along the section line VII—VII of FIG. 6.

FIG. 7 shows the drive unit 45 in a partial section. The housing pot 50 is secured on the housing 19 by fastening screws 51. It can also be expedient to configure housing 19 and housing pot 50 as a monolithic part. In the housing 19, a piezo actuator 9 is arranged which is comprised of packet-shaped stacked individual piezo elements. The piezo actuator 9 is connected by a connection 65 fixedly to the master piston 54. The connection 65 penetrates a bore 66 in the housing 19 as well as a bore 67 in the housing pot 50. The bore 67 is configured such that the connection 65 is sealtightly arranged therein. The master piston 54 has a first pressure surface 55 on the side facing away from the piezo actuator 9 as well as a second pressure surface 56 at the side facing the piezo actuator 9. The surface area of a second pressure surface 56 is smaller than the surface area of the first pressure surface 55 by the surface area of the connection 65.

On the plate 64 a slave piston 59 is supported which is movable in the direction of the movement axis 53. The movement axis 53 extends approximately perpendicularly to the longitudinal axis 52 of the piezo actuator 9. The longitudinal axis 52 at the same time provides the movement axis of the master piston 54. The slave piston 59 has a first pressure surface 60 facing away from the tool insert 46 and a second pressure surface 61 facing the tool insert 46. The two pressure surfaces 60 and 61 have the same size. The first pressure surface 60 is in fluid communication via connection 62 with the first pressure chamber 57. The first pressure chamber 57 adjoins the first pressure surface 55 of the master piston 54. The second pressure chamber 58 formed by the second pressure surface 56 is connected by a connection 63 to the second pressure surface 61. The connections 62 and 63 are formed as channels.

The movement of the master piston 54 in the direction toward the pressure chamber 57 produces in the first pressure chamber 57 an over pressure. In this way, a force is exerted on the first pressure surface 60 of the slave piston 59 in the direction of the arrow 73. At the same time, in the second pressure chamber 58 an under pressure is produced so that a force is created that acts on the second pressure surface 61 in the direction of arrow 73. The tool insert 46 is thus moved in the direction of arrow 73. For producing a return movement in the direction of arrow 74, the voltage supplied to the piezo actuator 9 is lowered, in particular down to zero, so that a movement of the master piston 54 in the direction toward the pressure chamber 58 is effected. The over pressure that is produced in this way in the pressure chamber 58 exerts on the second pressure surface 61 a force in the direction of arrow 74. The under pressure that is produced at the same time in the pressure chamber 57 exerts on the pressure surface 60 a force in the direction of arrow 74. In this way, the tool insert 46 is driven in both movement directions. It can be expedient to arrange at one or both pressure chambers one or several additional slave pistons that are coupled to the slave piston 59. In this way, an overlapped movement can be achieved. For example, the slave piston 59 can be pivoted in addition to the movement that is carried out perpendicularly to the longitudinal axis 52.

The drive unit comprised of a piezo actuator and an adjusting travel enlarger can be used as the only drive in a tool. However, it may be expedient to couple the drive unit with one or several drive units. For example, in particular for a rotating drive action of a tool insert, an additional electric motor can be used. The drive unit can be employed for all types of reciprocating movements. Depending on the configuration of the adjusting travel enlarger, different stroke lengths and forces can be achieved. By means of a suitable arrangement and coupling of one or several slave pistons, different movement courses can be realized.

Expediently, the adjusting travel enlarger acts hydraulically. The pressure chamber of the adjusting travel enlarger is in this connection advantageously filled with glycerine, caoutchouc, rubber, grease or with liquids such as oil or water. Other filling media can also be expedient.

However, a mechanical adjusting travel enlarger can also be provided. The mechanical adjusting travel enlarger can enlarge the adjusting travel, for example, by a lever mechanism. Also, an enlargement by a gear arrangement can be expedient.

While specific embodiments of the invention have been shown and described in detail to illustrate the inventive principles, it will be understood that the invention may be embodied otherwise without departing from such principles.

What is claimed is:

1. A tool comprising:
   a tool insert;
   an electrically operated drive unit oscillatingly driving the tool insert;
   wherein the drive unit comprises a piezo actuator and an adjusting travel enlarger coupled to the piezo actuator;
   wherein the adjusting travel enlarger comprises a master piston, at least two slave pistons, and a pressure chamber, wherein the master piston actuates through the pressure chamber said at least two slave pistons;
   wherein said at least two slave pistons have pressure surfaces with differently sized surface areas.

2. The tool according to claim 1, wherein the piezo actuator and the master piston are fixedly connected to one another.

3. The tool according to claim 1, wherein the at least one slave piston has a pressure surface having a surface area that is 0.2 to 20 percent of a surface area of a pressure surface of the master piston.

4. The tool according to claim 3, wherein the surface area of the pressure surface of the slave piston is 1 percent to 10 percent of the surface area of the pressure surface of the master piston.

5. The tool according to claim 1, wherein said at least two slave pistons are coupled with one another.

6. The tool according to claim 5, further comprising:
   an actuator lever connecting a first one of said at least two slave pistons to the tool insert; and
   a coupling lever supported on a second one of said at least two slave pistons and connected to the actuator lever.

7. The tool according to claim 1 wherein the at least one pressure chamber is filled with glycerine, caoutchouc, rubber, grease, oil, or water.

8. The tool according to claim 1, wherein the piezo actuator is comprised of stacked piezo elements.

9. The tool according to claim 8, wherein the piezo elements each have a thickness of 0.02 mm to 2 mm.

10. The tool according to claim 9, wherein the piezo elements have a thickness of 0.5 mm to 1 mm.

11. A tool comprising:
    a tool insert;
    an electrically operated drive unit oscillatingly driving the tool insert;
    wherein the drive unit comprises a piezo actuator and an adjusting travel enlarger coupled to the piezo actuator;
    wherein the adjusting travel enlarger comprises a master piston, at least one slave piston, and at least two pressure chambers, wherein the master piston actuates through the at least two pressure chambers the at least one slave piston;
    wherein the master piston and the at least one slave piston each have two opposed pressure surfaces, wherein said at least two pressure chambers are closed relative to one another, wherein a first one of said two pressure surfaces of the master piston is connected by a first one of said at least two pressure chambers to a first one of said two pressure surfaces of the at least one slave piston and wherein a second one of said two pressure surfaces of the master piston is connected by a second one of said at least two pressure chambers to a second one of said two pressure surfaces of the at least one slave piston.

12. The tool according to claim 11, wherein said two pressure surfaces of the at least one slave piston each have a surface area that is 0.2 to 20 percent of a surface area of said two pressure surfaces of the master piston, respectively.

13. The tool according to claim 11, wherein the piezo actuator and the master piston are fixedly connected to one another.

14. The tool according to claim 11, wherein the at least two pressure chambers are filled with glycerine, caoutchouc, rubber, grease, oil, or water.

15. The tool according to claim 11, wherein the piezo actuator is comprised of stacked piezo elements.

16. The tool according to claim 15, wherein the piezo elements each have a thickness of 0.02 mm to 2 mm.

17. The tool according to claim 16, wherein the piezo elements have a thickness of 0.5 mm to 1 mm.

* * * * *